Aug. 13, 1929.                R. SALLER                1,724,044
                              SPEED CLUTCH
                           Filed Dec. 31, 1926
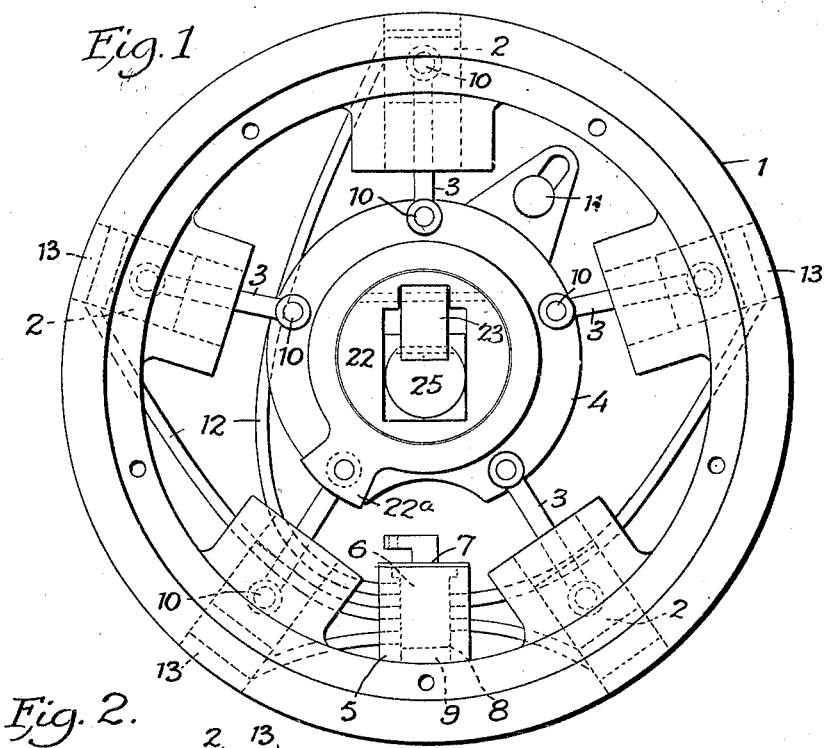
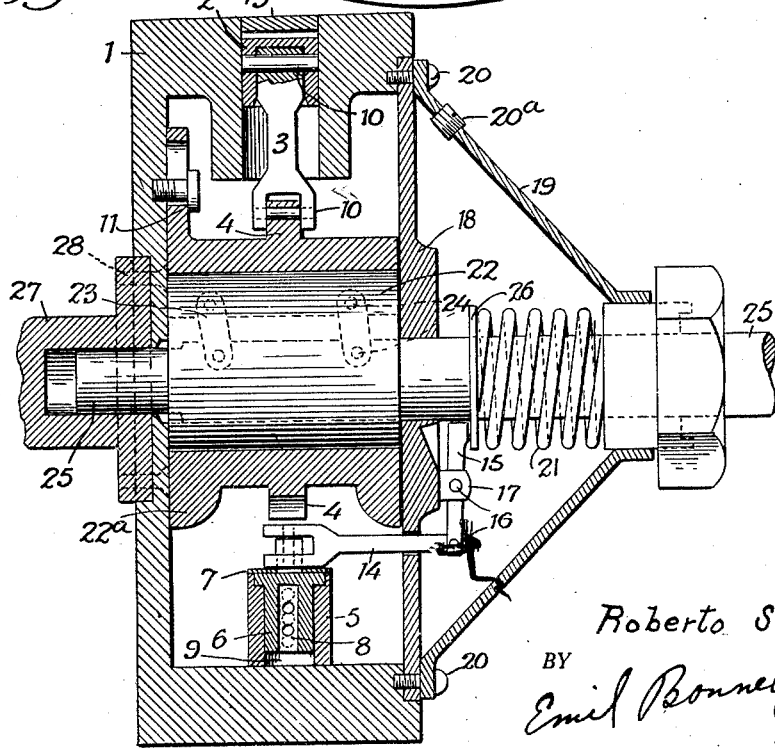
INVENTOR.
Roberto Saller
BY
Emil Bonnelycke
ATTORNEY.

Patented Aug. 13, 1929.

1,724,044

UNITED STATES PATENT OFFICE.

ROBERTO SALLER, OF BUENOS AIRES, ARGENTINA.

SPEED CLUTCH.

Application filed December 31, 1926. Serial No. 158,246.

My present invention relates to certain improvements in speed clutches, its main object being to provide a new hydraulic progressive speed clutch, which shows many advantages over those proposed and used heretofore.

The invention has also other objects in view which will be clearly seen from the following description.

In order that my present invention may be clearly understood and easily carried into practice a preferred embodiment thereof has been shown in the appended drawings wherein:

Figure 1 is a side view of a fly-wheel and the clutch mechanism with the shaft bearing and cover removed.

Figure 2 is a longitudinal section thereof.

Similar characters of reference denote same or like parts throughout the said drawings.

With reference to the said drawings: 1 is the fly-wheel having five cylinders therein, cast in one piece, 2 are the pistons, 3 are connecting rods, 4 is the connecting rod hub or member, 5 is the liquid control valve body, 6 the valve thereof and 7 the valve cover. 8 is the opening for the passage of the liquid through the valve and 9 the opening which connects the source of the liquid with the valve, 10 are piston and hub-pins, 11 is the fly-wheel support pin, 12 are pipes connecting the cylinders to the valves, 13 are the cylinder plugs, 14 is the control valve connecting rod, 15 is a control lever, 16 are the control lever pins, 17 is the control lever bracket, 18 is the drive shaft bearing and control lever support, 19 is the fly-wheel cover having a packing box, packing nut and spring support, 20 are flywheel cover screws, 20ª is the liquid filler plug, 21 is the excentric pressure spring, 22 is an excentric which forms the bearing for the connecting rod hub, 22ª is the connecting rod hub counterbalance, 23 are the excentric control levers, 24 are the excentric control lever pins, 25 is the main drive shaft, 26 is the clutch pressure spring support and valve control flange, 27 is the motor crank shaft, and 28 are the crank shaft flange screws.

The hydraulic progressive speed clutch is divided into two sections. One of these is composed of the flywheel, pistons, connecting rods, connecting rod hub, control valve, piping, drive shaft bearing, control lever support, flywheel cover with packing box, packing nut and spring support.

The second section is made up of the excentric mechanism and main drive shaft. These two sections may rotate separately or as one unit.

A motor car having installed the hydraulic progressive speed clutch needs no other control than a foot lever connected to the main drive shaft similar to a foot pedal for a disc clutch. By withdrawing the main drive shaft the excentric 22, which forms the bearing for the connecting rod hub, is moved into the centre with the main drive shaft by the excentric control levers 23. This same operation simultaneously causes the pistons and connecting rod hub to be centred with the flywheel and the main drive shaft. In this position the two sections may rotate freely at the same or different speeds. If the main drive shaft is allowed to go forward until the clutch spring support and control lever flange 26, come into contact with control lever 15, the whole mechanism becomes decentred by this movement, as shown in Figure 1, with the exception that the control valve still remains open.

If the flywheel is revolved the pistons will start to pump liquid into and out of the cylinders through the pipes and valve which is in an open position, that is to say, the slot in the valve is in line with the holes in the valve body, permitting a free circulation. Now if the main drive shaft is allowed to enter beyond this point it begins to press on the valve control lever 15 reducing the valve opening and applying pressure on the cylinders and suction on three, or else suction on two and pressure on three. This change depends on the position of the pistons in relation to the excentric, and thus increasing the pressure and suction until the valve is closed completely, whereby stopping the circulation of the liquid. The pressure applied to the pistons is transmitted to the excentric through the connecting rods causing the excentric to rotate in the same direction, whereas on the other side the suction pulls or draws the excentric also in the same direction until the oil circulation is completely stopped. In this case the pistons will also cease pumping, forming of the two sections one solid mass similar to a disc clutch when engaged.

From the foregoing it can be seen that any speed (not exceeding flywheel speed) may be obtained from the motor crank shaft by the simple control of the liquid pressure and suction of the pistons, regulated by means of the controlling valve which is arranged to open or close at the same time the five pipes leading to the pistons.

The liquid to be used should be oil, of which no more is required than will be sufficient to cover the cylinders when the flywheel is revolving.

It is obvious that many constructional and other changes may be made without departing from the scope of my present invention which has been clearly set forth in the appended claims.

Having now fully described and ascertained the nature of my present invention and in what manner the same is to be carried into practice, I declare that when I claim and desire to protect by Letters Patent is:—

1. A hydraulic speed clutch comprising a flywheel having a plurality of cylinders therein; a piston for each cylinder; a motor crank shaft secured to said flywheel; a main drive shaft; a member eccentrically mounted on the main drive shaft, said drive shaft being axially shiftable to vary the eccentricity of the member, and said pistons being connected to said member; a control valve in said flywheel; levers connecting the member and the main drive shaft; pipes connecting said cylinders to the control valve; and a lever system for operating said control valve.

2. A hydraulic speed clutch comprising a flywheel having a plurality of cylinders therein; a piston for each cylinder; a motor crank shaft secured to said flywheel; a main drive shaft; a member eccentrically mounted on the main drive shaft, said drive shaft being axially shiftable to vary the eccentricity of the member, and said pistons being connected to said member; a control valve in said flywheel; levers connecting the member and the main drive shaft; pipes connecting said cylinders to the control valve; a spring on said main drive shaft; and a lever system for operating said control valve.

In testimony whereof I affix my signature.

ROBERTO SALLER.